(12) United States Patent
Burda

(10) Patent No.: US 6,865,433 B1
(45) Date of Patent: Mar. 8, 2005

(54) METHOD, SYSTEM, AND STORAGE MEDIUM FOR OPTIMIZING SCHEDULING ACTIVITIES IN A MANUFACTURING ENVIRONMENT

(75) Inventor: Richard G. Burda, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/710,167

(22) Filed: Jun. 23, 2004

(51) Int. Cl.[7] .............................................. G06F 19/00
(52) U.S. Cl. ........................ 700/101; 700/121; 700/19; 702/82; 707/102
(58) Field of Search .................. 700/99–103, 106–108, 700/121, 19; 702/82, 84; 707/102; 705/7–9; 257/E21.525

(56) References Cited

U.S. PATENT DOCUMENTS 5,818,716 A * 10/1998 Chin et al. .................. 700/100
6,353,769 B1 * 3/2002 Lin ............................ 700/101
6,684,121 B1 * 1/2004 Lu et al. ..................... 700/108
2003/0130756 A1 * 7/2003 Baweja et al. .............. 700/100

* cited by examiner

Primary Examiner—Kidest Bahta
(74) Attorney, Agent, or Firm—Lisa U. Jaklitsch; Cantor Colburn LLP

(57) ABSTRACT

Exemplary embodiments include a method, system, and storage medium for optimizing scheduling activities in a manufacturing environment. The method includes receiving a planned factory cycle time value and schedule information for lots associated with a queue. The planned factory cycle time value includes an anticipated pace for lot workflow. Upon receiving a dispatch request, a critical ratio for each lot is calculated and compared with the planned factory cycle time value. An 'at risk' value is assigned to a lot when the planned factory cycle time value is greater than the lot's critical ratio. A higher priority is assigned to lots determined to be at risk than the priority assigned to those lots not at risk. The at risk lots are sorted by a priority value set during a planning period and also by a critical ratio. The lots not at risk are sorted by critical ratio.

18 Claims, 3 Drawing Sheets

FIG. 3

| | Priority | CR |
|---|---|---|
| LOT D | 1 | 2.8 |
| LOT C | 2 | 3.3 |
| LOT A | 3 | 2.5 |
| LOT B | 3 | 3.1 |
| LOT E | 3 | 4.1 |

FIG. 4

| | Priority | CR |
|---|---|---|
| LOT A | 3 | 2.5 |
| LOT D | 1 | 2.8 |
| LOT B | 3 | 3.1 |
| LOT C | 2 | 3.3 |
| LOT E | 3 | 4.1 |

FIG. 5

| | PRIOR | CR | AT RISK | PFCT |
|---|---|---|---|---|
| LOT A | 1 | 2.8 | YES | 3 |
| LOT D | 3 | 2.5 | YES | 3 |
| LOT B | 3 | 3.1 | NO | 3 |
| LOT C | 2 | 3.3 | NO | 3 |
| LOT E | 3 | 4.1 | NO | 3 |

US 6,865,433 B1

METHOD, SYSTEM, AND STORAGE MEDIUM FOR OPTIMIZING SCHEDULING ACTIVITIES IN A MANUFACTURING ENVIRONMENT

BACKGROUND OF INVENTION

The present invention relates generally to scheduling activities, and more particularly, to a method, system, and storage medium for optimizing scheduling activities in a manufacturing environment.

Scheduling refers to the labor, equipment, and facilities required in order to produce a product or provide a service. It is typically the last stage of planning before production activities are implemented. Various scheduling methods (e.g., backward scheduling and forward scheduling) have been created that are selected by an entity based upon the nature of operations being conducted by the entity. Further, scheduling activities may be categorized by long-term, intermediate-term, and short-term scheduling. Short-term scheduling is focused on work center loading and job sequencing functions. Sequencing refers to the release of work orders to a job location and the issuance of dispatch lists to a specific machine. Oftentimes, scheduled jobs or lots ready for processing await dispatch while sitting in a job queue. Priorities are often assigned to the jobs or lots depending upon the entity's and/or customer's goals. Priorities may also be defined by methods such as a critical ratio (CR) number that is generated by dividing the number of days remaining before the due date by the required processing time for the lot. Lots with lower critical ratios are considered a higher priority.

These and other priority scheduling methods suffer several disadvantages. For example, using CR scheduling in an over-loaded work location may cause all lots to equally absorb delays in their cycle time irrespective of their assigned priorities. Using an assigned priority scheme alone may result in wasted resources where the scheme drives specified lots with a high priority to be processed well before their due dates where a specified lot with a lower priority could have been accelerated to meet its due date.

What is needed, therefore, is a way to optimize scheduling activities in a manufacturing environment.

SUMMARY OF INVENTION

The above-described disadvantages are overcome or alleviated by a method, system, and storage medium for optimizing scheduling functions in a manufacturing environment. The method includes receiving a planned factory cycle time value and schedule information for lots associated with a queue. The planned factory cycle time value includes an anticipated pace for lot workflow. Upon receiving a dispatch request, a critical ratio for each lot is calculated and compared with the planned factory cycle time value. An 'at risk' value is assigned to a lot when the planned factory cycle time value is greater than the lot's critical ratio. A higher priority is assigned to lots determined to be at risk than the priority assigned to those lots not at risk. The at risk lots are sorted by a priority value set during a planning period and also by a critical ratio. The lots not at risk are sorted by critical ratio. A dispatch list is generated as a result of the sorting.

BRIEF DESCRIPTION OF DRAWINGS

Referring now to the drawings wherein like elements are numbered alike in the several FIGURES:

FIG. 3 is a sample dispatch list for a queue of job lots resulting from a priority-only scheduling scheme;

FIG. 4 is a sample dispatch list for a queue of job lots resulting from a critical ratio scheduling scheme; and FIG. 5 is a sample dispatch list for a queue of job lots resulting from a conditional critical ratio scheduling scheme that is generated via the scheduling optimizer in exemplary embodiments.

DETAILED DESCRIPTION

The scheduling optimizer enables identification and prioritization of 'at risk' lots and accelerates them in the scheduling dispatch list. The scheduling optimizer evaluates a critical ratio (CR) for lots in a queue, in light of a parameter referred to herein as a planned factory cycle time (PFCT) value, in determining which lots in the queue are at risk. The scheduling optimizer drives only the lowest priority lots to absorb the delays in the factory, which maximizes the level of service that may be offered by the factory. The scheduling optimizer may be implemented as a standalone scheduling application or may be incorporated into an existing scheduling application as is known in the art.

Figure 1:
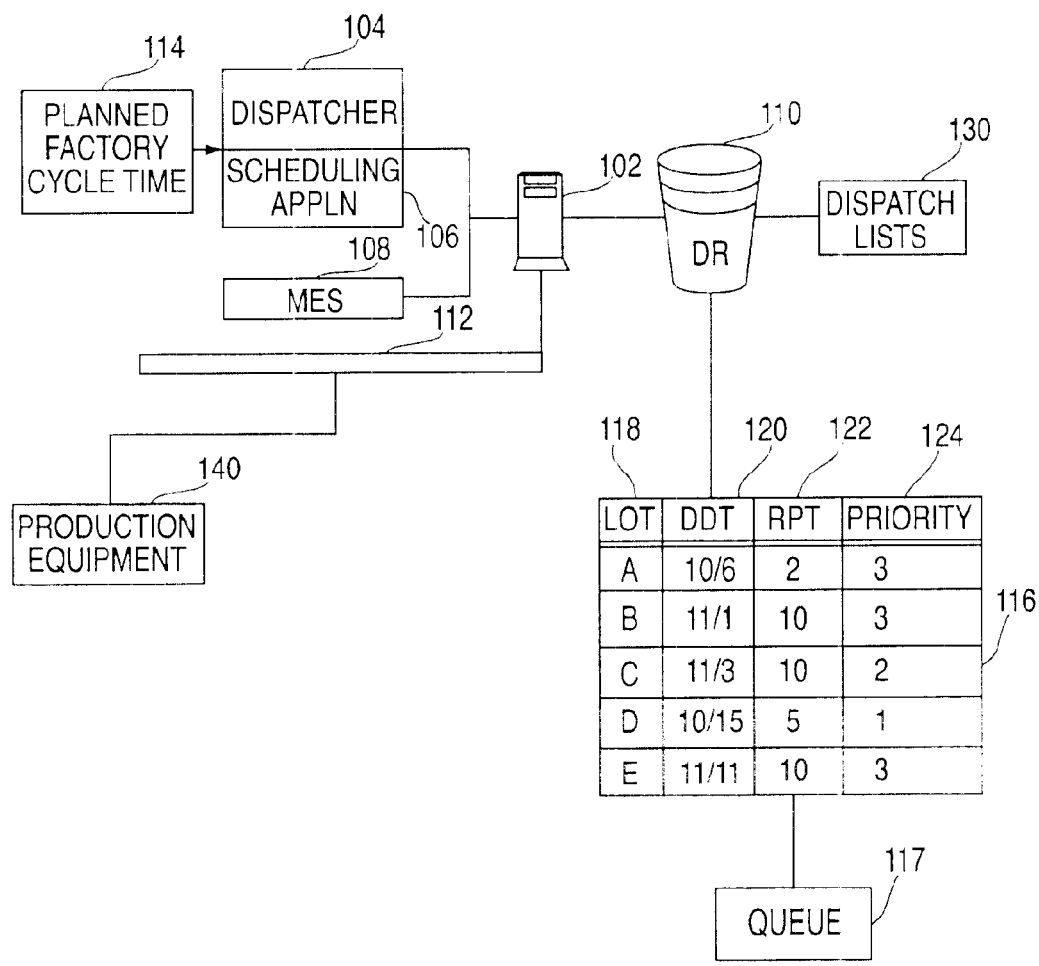
FIG. 1 is a block diagram of a system upon which the scheduling optimizer may be implemented in exemplary embodiments.

Referring now to FIG. 1, a system upon which the scheduling optimizer may be implemented will now be described. FIG. 1 includes a host system 102 in communication with production equipment 140 via a network 112. Host system 102 may comprise a high-speed processor such as a mainframe computer or advanced computer system for implementing the features and functions of the invention as described herein. In exemplary embodiments, host system 102 is associated with a manufacturing entity, although other industry environments may benefit from the invention as well.

Host system 102 executes a variety of enterprise applications such as a manufacturing execution system software application 108 and a scheduling application 106. Scheduling application 106 further includes a dispatcher component 104 for dispatching pending process jobs to production equipment 140. Scheduling application 106 may be a commercial off-the-shelf product or may be a proprietary tool of the enterprise of host system 102. Manufacturing execution system (MES) software 108 is executed by host system 102 for managing the high-level production operations of the enterprise of FIG. 1.

Host system 102 is in communication data repository 110 which stores a variety of information for the enterprise such as planning and production schedules, bills of materials, reports, and other similar types of data. It will be understood by those skilled in the art that data repository 110 and host system 102 may comprise a single unit; however, they are shown as separate elements for illustrative purposes. Further, data repository 110 stores dispatch lists 130 that are generated as a result of the execution of scheduling application 106. Dispatch lists 130 provide details relating to one or more jobs or lots in a queue that are pending processing by production equipment 140. These lists 130 are described further herein.

Production equipment 140 includes any machine or device that processes materials (e.g., lots) in a manufacturing work location such as a processing bay or facility.

Production equipment 140 may communicate with host system 102 via network 112 for receiving and transmitting signals relating to loading/unloading process materials from a loadport, transport instructions, current status of a job, error notifications, etc. Network 112 may include any suitable communications network including wireline or wireless technologies. In a preferred embodiment, network 112 is a local area network that services production equipment 140 and other equipment devices in the general vicinity of production equipment 140. PFCT value 114 is a data input value provided to the scheduling application 106 and is described further herein.

Data repository 110 also stores schedule information for one or more jobs/lots assigned to a queue 117 awaiting processing. Schedule information 116 includes a lot identifier 118, a due date for each lot 120, a raw processing time (RPT) for each lot 122, and a priority value 124 assigned to each lot. This information is typically entered into scheduling application during the planning process. Lot identifiers 118 as shown in FIG. 1 refer to five Lots, labeled A–E. The due date 120 may refer to the date that the factory enterprise and its customer have agreed upon as the date in which a finished product will be shipped.

The raw processing time (RPT) value 122 refers to the actual processing time required for the lot. This time 122 includes only the time that the lot is engaged with production equipment 140. In a semiconductor manufacturing environment, it is common for lots to re-enter a work queue for continued processing. Thus, an RPT value changes over the course of a lot's processing lifetime. Priority value 124 refers to a value assigned to each lot for determining the importance of which lots A–E in the queue 117 and maybe used to expedite the processing of lots that are assigned a higher priority value 124. The scheduling optimizer utilizes the schedule information 116, the lot's critical ratio (CR), and the PFCT value 114 in determining how lots in a queue 117 should be prioritized, above and beyond the priority level 124 that was set during the planning process.

The scheduling optimizer considers the anticipated total lot cycle time in establishing a PFCT value for a lot. The anticipated total lot cycle time refers to the total amount of time a lot is typically held up in a work location. For example, while the raw processing time 122 required for a lot may be one day, there may be additional time associated with this processing time such as waiting time, loading and unloading time, transport within and/or between production bays, etc. This collective time (i.e., the RPT and the additional time) is used to establish a PFCT value 114. The PFCT value 114 refers to the averaged planned pace at which lots are expected to proceed in a factory. A planner may set the PFCT value 114 by determining both the average total lot time for all lots in a factory and the average RPT for these lots. The resulting total lot cycle time average may then be divided by the RPT average resulting in the PFCT value, or the average pace at which lots are expected to proceed through the factory.

Figure 2:
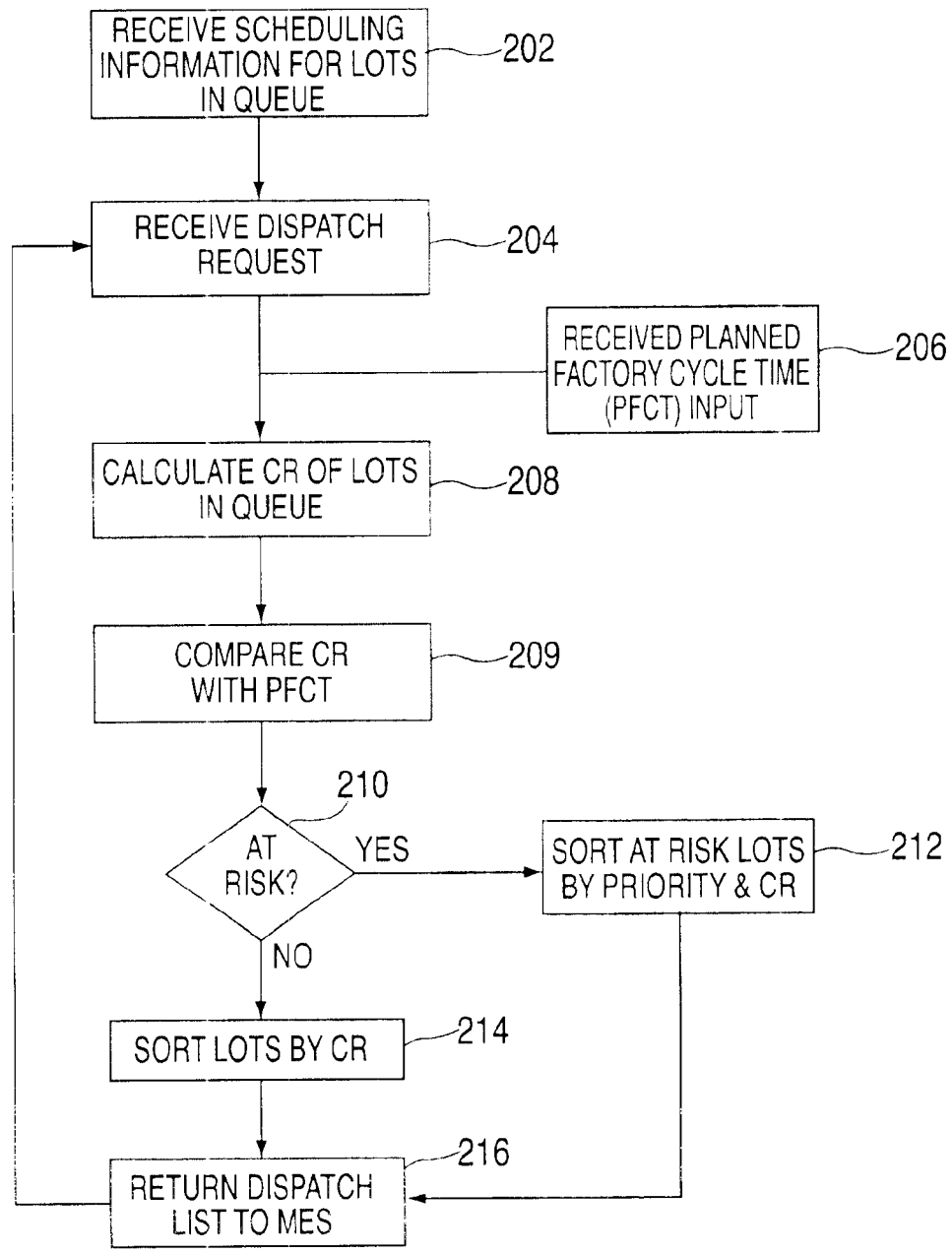
FIG. 2 is a flowchart describing a process for implementing the scheduling optimizer in exemplary embodiments.

Referring now to FIG. 2, a process for implementing the scheduling optimizer will now be described. At step 202, scheduling information 116 associated with lots in queue 117 is retrieved from data repository 110 by scheduling application 106. At step 204, a dispatch request from dispatcher 104 is received at host system 102 indicating that lots A–E in queue 117 are ready to be dispatched to production equipment 140. The dispatch request may be generated manually by an operator of production equipment 140 or may be initiated by one or more of MES 108 or production equipment 140 via network 112.

At the instant of dispatch, a PFCT value 114 for the lots in queue 117 is input into scheduling application 106 at step 206. The scheduling optimizer calculates the CR for each of the lots in queue 117 at step 208. The CR is calculated by dividing the time remaining before the lot is due by the RPT 122. The time remaining before the lot is due may be calculated by subtracting the due date 120 from the current date. This information may be provided via scheduling information 116. The CR for each lot is then compared with the PFCT at step 209. If the PFCT is greater than the CR, then the lot is considered to be at risk. This means that the pace at which a lot is expected to proceed through the factory, when compared with its required processing time and upcoming due date, indicates that the lot will not meet its scheduled completion date. Further, the greater the disparity between the PFCT and CR values, the greater the risk becomes for the lot. If, however, the PFCT is less than or equal to the CR, the lot is deemed not to be at risk.

If, as a result of performing step 209, it is determined that one or more lots are at risk at step 210, then the scheduling optimizer sorts the at risk lots by priority and then by CR (also referred to herein as conditional CR scheduling), at step 212. Through identification and prioritization of 'at risk' lots, the dispatcher accelerates the most important lots so that they are delivered on time. The scheduling optimizer may be especially effective in disconnected flow lines with re-entrant routes because the CR calculation 'normalizes' the priority of lots that may be at the beginning, middle, or end of the flow line. The resulting dispatch list 130 is then returned to MES 108 at step 216 for execution.

If one or more lots in queue 117 are not considered to be at risk, then the lots are sorted by CR only at step 214. Thus, if the factory is over scheduled and some lots will be completed late, the scheduling optimizer ensures that the lots completed late will be those with the lowest priority. In contrast, using CR-only dispatching in an over scheduled factory (as shown generally in FIG. 4), may cause many lots of all priorities to be late. This sorted dispatch list 130 is then returned to MES 108 at step 216. These steps 204–216 are performed each time a dispatch request is received for a queue 117.

FIGS. 3–5 illustrate sample dispatch lists, each for a different scheduling scheme. As shown in FIG. 3, dispatch list 300, utilizes a strict priority scheduling scheme known in the art. Priority scheduling offers some disadvantages as can be seen from dispatch list 300. For example, this scheduling scheme will result in lot C 302, with a priority of 2, running before lot A 304, with a priority of 3. This is a waste of available system resources as the CR 306 of lot A 304 is lower than the CR 308 of lot C 302, indicating an urgency that is more severe for lot A 304 than it is for lot C 302.

FIG. 4 illustrates a sample dispatch list 400 for a scheduling scheme that utilizes strict critical ratio. As can be seen from dispatch list 400, the CR scheduling scheme will run lot A 402, with a CR of 2.5, before lot B 404, with a CR of 3.1, because the scheme provides that lots with a lower CR take priority over those with higher CRs. This scheme, however, may cause lot A 402 (with the higher priority) to be late.

FIG. 5 illustrates a sample dispatch list 500 utilizing the conditional CR scheduling of the invention. Conditional CR scheduling will run 'at risk' lots by priority ahead of all 'on-time' lots (i.e., those determined not to be at risk). This ensures that high priority lots run on time without wasting capacity to get a lot completed early. It is assumed for illustrative purposes that the current date is October 1. As can be seen from the diagram of FIG. 5, lots D 502 and A 504 have been identified as being 'at risk'. It is assumed for purposes of illustration that the PFCT value 114 assigned for all lots is 3. As indicated above, in a semiconductor manufacturing environment, one or more lots may re-enter a queue for continued processing. Thus, each lot may have a different RPT associated therewith.

As FIG. 1 illustrates, the RPT 122 for lot D 502 is 5. The CR is calculated by dividing the number of days before the lot is due (i.e., 14) by the RPT 122 of 5, resulting in a CR 512 of 2.8. Because the PFCT 501 (i.e., 3) is greater than the CR 512, lot D 502 is considered to be at risk. Turning to lot A 504, the RPT 122 is 2 days and the number of days before the lot is due is 5 (October 6–October 1), resulting in a CR of 2.5. Again, the PFCT value 501 is greater than the CR 514 of lot A 504. Accordingly, lot A 504 is considered to at risk also. Lots B 506, C 508, and E 510 are not considered be at risk because their PFCT values 501, respectively, are less than their CRs 522–526. The scheduling optimizer will sort lots A–E 502–510, whereby at risk lots A 504 and D 502 are placed at a higher priority than lots B 506, C 508, and E 510 which are not at risk. The scheduling optimizer will then further sort the at risk lots by priority, whereby lot D 502 with a priority 528 of 1 will be processed before lot A 504 with a priority 530 of 3. The scheduling optimizer will further sort the lots that are not at risk by their CRs.

As described above, the scheduling optimizer enables identification and prioritization of 'at risk' lots and accelerates them in the scheduling dispatch list. The scheduling optimizer evaluates a critical ratio (CR) for lots in a queue, in light of a parameter referred to herein as a planned factory cycle time (PFCT) value, in determining which lots in the queue are at risk. The scheduling optimizer drives only the lowest priority lots to absorb the delays in the factory, which maximizes the level of service that may be offered by the factory.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for optimizing scheduling activities in a manufacturing environment, comprising:
   receiving a planned factory cycle time value for lots associated with a queue, said planned factory cycle time value including an anticipated pace for lot workflow;
   receiving schedule information for said lots;
   upon receiving a dispatch request for said lots;
   calculating a critical ratio for each of said lots;
   comparing said critical ratio with said planned factory cycle time value; and
   assigning an 'at risk' value to a lot when said planned factory cycle time value is greater than the critical ratio for said lot;
   for lots assigned said 'at risk' value:
   assigning a higher priority than a priority that is assigned to lots determined not to be at risk; and
   sorting said at risk lots by both a priority that was set during a planning period and the critical ratio;
   sorting said lots determined not to be at risk by the critical ratio; and
   returning a resulting dispatch list with priority assignments made as a result of said sorting to a manufacturing execution system.

2. The method of claim 1, wherein said planned factory cycle time is determined by:
   averaging a total anticipated cycle time for lots in said factory;
   averaging raw processing times for said lots in said factory; and
   dividing averaged total anticipated cycle time for said lots by averaged raw processing times for said lots;
   wherein said total anticipated cycle for said lots includes;
   said raw processing times;
   time said lots are awaiting processing;
   time said lots are loaded and unloaded from production equipment; and
   time said lots are transported within said factory.

3. The method of claim 2, wherein said raw processing time includes the time that a lot is actively engaged in processing with said production equipment.

4. The method of claim 1, wherein said scheduling information includes at least one of:
   a lot identifier;
   a due date for said lot;
   a raw processing time for said lot; and
   a priority value assigned to said lot during a planning period.

5. The method of claim 1, wherein said critical ratio is determined by dividing a number of days before a lot is due by a raw processing time associated with said lot.

6. The method of claim 2, wherein said raw processing time is adjusted for a lot undergoing re-entrance to a queue.

7. A system for optimizing scheduling activities in a manufacturing environment, comprising:
   a scheduling application for:
   receiving a planned factory cycle time value for lots associated with a queue, said planned factory cycle time value including an anticipated pace for lot workflow; and receiving schedule information for said lots; and a queue for assigning said lots to production equipment, wherein said lots are awaiting processing by said production equipment;

wherein upon receiving a dispatch request for said lots, said scheduling application performs;

calculating a critical ratio for said each of said lots;

comparing said critical ratio with said planned factory cycle time value; and assigning an 'at risk' value to a lot when said planned factory cycle time value is greater than a critical ratio for said lot;

for lots assigned said 'at risk' value;

assigning a higher priority than a priority that is assigned to lots determined not to be at risk; and sorting said at risk lots by both a priority that was set during a planning period and the critical ratio;

sorting said lots determined not to be at risk by the critical ratio; and returning a resulting dispatch list with priority assignments made as a result of said sorting to a manufacturing execution system.

8. The system of claim 7, wherein said planned factory cycle time is determined by:

averaging a total anticipated cycle time for lots in said factory;

averaging raw processing times for said lots in said factory; and dividing averaged total anticipated cycle time for said lots by averaged raw processing times for said lots;

wherein said total anticipated cycle for said lots includes;

said raw processing times;

time said lots are awaiting processing;

time said lots are loaded and unloaded from production equipment; and time said lots are transported within said factory.

9. The system of claim 8, wherein said raw processing time includes the time that a lot is actively engaged in processing with said production equipment.

10. The system of claim 7, wherein said scheduling information includes at least one of:

a lot identifier;

a due date for said lot;

a raw processing time for said lot; and a priority value assigned to said lot during a planning period.

11. The system of claim 7, wherein said critical ratio is determined by dividing a number of days before a lot is due by a raw processing time associated with said lot.

12. The system of claim 8, wherein said raw processing time is adjusted for a lot undergoing re-entrance to a queue.

13. A storage medium encoded with machine-readable computer program code for optimizing scheduling activities in a manufacturing environment, said program code including instructions for causing a scheduling application to perform a method, comprising:

receiving a planned factory cycle time value for lots associated with a queue, said planned factory cycle time value including an anticipated pace for lot workflow;

receiving schedule information for said lots;

upon receiving a dispatch request for said lots;

calculating a critical ratio for said each lot;

comparing said critical ratio with said planned factory cycle time value;

assigning an 'at risk' value to a lot when said planned factory cycle time value is greater than the critical ratio for said lot;

for lots assigned said 'at risk' value;

assigning a higher priority than a priority that is assigned to lots determined not to be at risk; and sorting said at risk lots by both a priority that was set during a planning period and the critical ratio;

sorting said lots determined not to be at risk by the critical ratio; and returning a resulting dispatch list with priority assignments made as a result of said sorting to a manufacturing execution system.

14. The storage medium of claim 13, wherein said planned factory cycle time is determined by:

averaging a total anticipated cycle time for lots in said factory;

averaging raw processing times for said lots in said factory; and dividing averaged total anticipated cycle time for said lots by averaged raw processing times for said lots;

wherein said total anticipated cycle for said lots includes;

said raw processing times;

time said lots are awaiting processing;

time said lots are loaded and unloaded from production equipment; and time said lots are transported within said factory.

15. The storage medium of claim 14, wherein said raw processing time includes the time that a lot is actively engaged in processing with said production equipment.

16. The storage medium of claim 13, wherein said scheduling information includes at least one of:

a lot identifier;

a due date for said lot;

a raw processing time for said lot; and a priority value assigned to said lot during a planning period.

17. The storage medium of claim 13, wherein said critical ratio is determined by dividing a number of days before a lot is due by a raw processing time associated with said lot.

18. The storage medium of claim 14, wherein said raw processing time is adjusted for a lot undergoing re-entrance to a queue.

* * * * *